United States Patent Office 2,860,169
Patented Nov. 11, 1958

2,860,169

PROCESS FOR PRODUCING 1,2,3-TRIALKYLBENZENES BY ALKYL TRANSFER REACTIONS

Maurice J. Schlatter, Berkeley, Calif., assignor to California Research Corporation, San Francisco, Calif., a corporation of Delaware No Drawing. Application March 25, 1953
Serial No. 344,655

3 Claims. (Cl. 260—672)

This invention relates to new and useful trialkylbenzenes and to a method for producing them.

Few 1,2,3-trialkylbenzenes occur naturally and few syntheses of such materials have been reported.

1,2,3-trialkylbenzenes in which one of the alkyl groups contains 5 or more carbon atoms are not believed to have been prepared heretofore.

It is an object of this invention to provide a method for the synthesis of 1,2,3-trialkylbenzenes.

It is a further object of this invention to provide new polyalkylbenzene compositions having the formula:

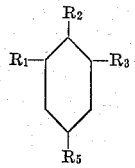

in which $R_1$, $R_2$ and $R_3$ are alkyl groups, at least one of which contains at least 6 carbon atoms, and $R_5$ is either a tertiary-butyl group or hydrogen.

It has now been found that 1,2,3-trialkylbenzenes may be prepared by alkylating a 1,2-dialkylbenzene or a 1,3-dialkylbenzene with a tertiary-alkylating agent under conventional alkylating conditions whereby the alkylating agent attaches itself to the benzene nucleus at a position meta to at least one of the original alkyl groups, reacting the produced tertiary-alkyl dialkylbenzene with a material of the group, non-tertiary-alkylating agents, chloroalkylating agents, and acylating agents, to selectively replace the nuclear hydrogen atom of the dialkyl tertiary-benzene furthest removed from the tertiary-alkyl group, and reducing said chloroalkyl or acyl groups to replace chlorine or oxygen atoms with hydrogen.

Suitable dialkylbenzene starting materials include orthoxylene, meta-xylene, 1-methyl-2-ethylbenzene, 1-methyl-3-ethylbenzene, ortho-diethylbenzene, meta-diethylbenzene, 1-methyl-2-propylbenzene, 1-methyl-3-propylbenzene, and other ortho- and meta-dialkylbenzenes in which each alkyl group contains 1 to 6 carbon atoms, and preferably 1 to 3 carbon atoms, and in which each alkyl group has at least one hydrogen atom attached to the alpha-carbon atom.

The term "tertiary-alkylating agent" is employed herein to indicate an alkylating agent containing a tertiary carbon atom having no hydrogen atom bonded to it. Suitable tertiary-alkylating agents for use in the process of the invention include tertiary-olefins, tertiary-alcohols, tertiary-alkyl chlorides, tertiary-cycloalkenes, tertiary-cycloalkyl chlorides, etc. Of the numerous tertiary-alkylating agents available it is preferred to employ those which introduce a tertiary-butyl group into the material undergoing alkylation, for example, isobutene, tertiary-butyl alcohol, tertiary-butyl chloride, tertiary-butyl mercaptan, and diisobutylene. Tertiary-alkylating agents of higher molecular weight such as the $C_5$ to $C_7$ tertiary-olefins, tertiary-alcohols and tertiary-alkyl chlorides may be employed. Also, tertiary-cycloalkyl derivatives such as 1-methyl-cyclohexene, 1,3-dimethyl-1-chlorocyclopentane, 1-methylcyclopentanol may be employed.

When a tertiary-alkylating agent is condensed with a 1,2-dialkylbenzene or with a 1,3-dialkylbenzene in which each alkyl group contains at least one hydrogen atom attached to the alpha-carbon atom, the tertiary-alkyl group is attached to the benzene nucleus at a position which is in meta-relationship to one of the alkyl groups in the case of a 1,2-dialkylbenzene, and in meta-relationship to both of the alkyl groups in the case of a 1,3-dialkylbenzene, as indicated by the following equations where the symbol t—R indicates the tertiary-alkylating agent:

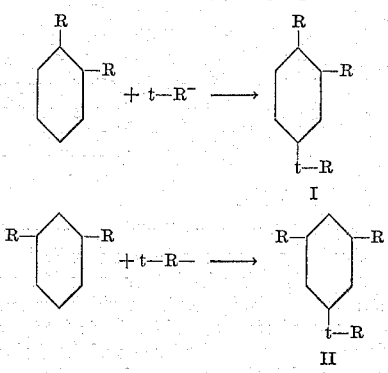

The tertiary-alkyl groups introduced into the benzene nucleus in the manner shown above exercise a strong blocking and directing influence when compounds I or II, shown above, are reacted with a non-tertiary-alkylating agent, a chloroalkylating agent, or an acylating agent. The selected agent enters each of the compounds I and II so as to produce 1,2,3-trisubstituted-5-tertiary-alkyl benzene by replacing the nuclear hydrogen atom furthest removed from the tertiary-alkyl group as illustrated by the following equation:

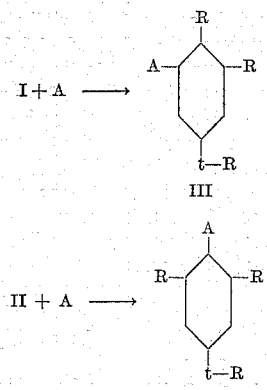

Suitable non-tertiary alkylating agents include non-tertiary olefins containing 2 to 20 carbon atoms, non-tertiary alcohols containing up to 20 carbon atoms and non-tertiary alkyl chlorides containing up to 20 carbon atoms and they all selectively replace the nuclear hydrogen furthest removed from the tertiary-alkyl group of the dialkyl tertiary-alkyl benzene when the materials are contacted under conventional alkylating conditions in the presence of conventional catalysts.

Both of the alkylation reactions described above are conducted using conventional alkylation catalysts and conventional alkylating conditions. Catalysts or condensing agents which can be used in the alkylating step include hydrofluoric acid, sulfuric acid, Friedel-Crafts catalysts such as zinc chloride, aluminum chloride, ferric chloride and boron fluoride and complexes of Friedel-Crafts catalysts with organic polar liquids such as nitrobenzene, chloroform and nitromethane. The alkylation reactions are conducted at temperatures in the range about −10 to +100° C. It is preferable to employ relatively mild alkylating conditions in order that side reactions and any tendency toward isomerization of the alkyl benzenes may be suppressed and, accordingly, the alkylation steps are preferably conducted at temperatures below about 70° C., although the optimum temperature for each catalyst will be different and with some catalysts such as silica-alumina and phosphoric acid or kieselguhr it may be much higher than this.

As indicated above, either the 1,2-dialkyl-4-tertiary-alkylbenzene or the 1,3-dialkyl-5-tertiary-alkylbenzene can be reacted with an acylating agent such as an aliphatic acid chloride, acetic anhydride or acetyl chloride with the result that the nuclear hydrogen atom furthest removed from the tertiary alkyl group is selectively replaced by an acyl group, yielding an acyl dialkyl tertiary-alkylbenzene in which the acyl group and two alkyl groups are in 1,2,3-relationship and the tertiary-alkyl group is in the 5-position. These acyl compounds are then reduced to 1,2,3,5-tetra-alkylbenzenes having the tertiary-alkyl group in the 5-position. The reduction is readily accomplished by conventional methods and proceeds without appreciable concurrent isomerization.

The 1,2-dialkyl-4-tertiary-alkylbenzenes or 1,3-dialkyl-5-tertiary-alkylbenezenes can be chloroalkylated by conventional methods using hydrogen chloride and formaldehyde, hydrogen chloride and acetaldehyde, and the like, in the presence of zinc chloride, if desired, to facilitate the reaction. The nuclear hydrogen of the dialkyl tertiary-alkylbenzene which is furthest from the tertiary-alkyl group is selectively replaced by the chloroalkyl group, forming a chloroalkyl-dialkyl-tertiary-alkylbenzene having the chloroalkyl group and the two alkyl groups in the 1,2,3-relationship and the tertiary-alkyl group in the 5-position. The chloroalkyl reaction products are readily reduced by conventional methods, forming 1,2,3-trialkyl-5-tertiary-alkylbenzenes.

Following the second alkylation step, or following the reduction of the acylation or chloroalkylation reaction product to a 1,2,3,5-tetra-alkylbenzene, the tertiary-alkyl group is removed from the 1,2,3-trialkyl-5-tertiary-alkylbenzene to produce the desired 1,2,3-trialkylbenzene product. The removal of the tertiary-alkyl group is accomplished by subjecting the 1,2,3-trialkyl-5-tertiary-alkylbenzene to mild conventional dealkylation treatments which selectively remove the tertiary-alkyl group, or by equilibrating these materials with suitable acceptors for the tertiary-alkyl group in the presence of an alkylation catalyst under conditions vigorous enough to permit transfer of the tertiary-alkyl group, but sufficiently mild that a significant amount of isomerization of the remaining structure does not occur. Suitable acceptors include benzene, phenol, toluene, ortho-xylene, meta-xylene, and other aromatic compounds which can be readily alkylated with tertiary-alkylating agents.

The tertiary-alkyl group may be selectively removed from 1,2,3-trialkyl-5-tertiary-alkylbenzenes by contacting these materials with a dealkylation catalyst such as the metals of group VI and group VIII of the periodic table, or with alumina or clay at temperatures in the range from about 250° C. to 500° C. The tertiary-alkyl groups, especially the tertiary-butyl group, are much more readily removed from the benzene ring than the other alkyl groups and their removal is accomplished with relatively little concurrent isomerization of the resultant 1,2,3-trialkylbenzenes.

When 1,2,3-trialkyl-5-tertiary-alkylbenzenes are mixed with benzene, toluene, ortho-xylene, phenol or meta-xylene and the mixture is contacted with an alkylation catalyst under alkylating conditions, the tertiary-alkyl group is transferred from its position on the ring of the 1,2,3-trialkyl-5-tertiary-alkylbenzene to the acceptor molecules.

Where either of the above-described methods of removing the tertiary-alkyl group from the ring is employed, the desired 1,2,3-trialkylbenzenes are readily recovered from the reaction product mixture by fractional distillation. The following examples illustrate the process of the invention and the new 1,2,3-trialkylbenzenes which may be produced by it.

EXAMPLE 1

A mixture of 961 g. (9.0 moles) of meta-xylene and 448 g. (8.0 moles) of isobutene was added over a period of 4.2 hours to 150 g. (7.5 moles) of liquid hydrogen fluoride contained in a copper flask equipped with stainless-steel stirrer, addition-tube and gas-outlet. The flask was cooled in an ice-bath. Stirring was continued for 2 hours after the end of the addition period. The contents of the flask were poured on crushed ice, neutralized with excess potassium hydroxide and the organic phase separated, washed with sodium bicarbonate solution, dried and distilled. The product contained 17% by weight of meta-xylene, 76% of 1,3-dimethyl-5-tertiary-butylbenzene (B. P. 206–207° C., $n_D^{20}$ 1.4960) and 7% of higher-boiling products.

186.6 g. (1.15 moles) of the 1,3-dimethyl-5-tertiary-butylbenzene was placed in a copper flask equipped with stirrer, gas-addition tube and gas outlet tube and cooled in an ice bath. When the temperature reached 0° C., 143 g. (7.15 moles) of liquid hydrogen fluoride was added. The mixture was vigorously stirred and ethylene bubbled through at a rate of 300 ml. per minute for 6 hours. The reaction mixture was poured on crushed ice and the hydrofluoric acid neutralized with excess potassium hydroxide. The organic phase and toluene extracts of the aqueous phase were combined, dried over calcium chloride and fractionally distilled through a 75 cm. x 16 mm. column packed with 3/32 inch glass helices.

A 1,3-dimethyl-2-ethyl-5-tertiary-butylbenzene fraction boiling from 152.1 to 152.8 at 50 mm. pressure was separated during the distillation. This fraction contained more than 90% of the desired 1,3-dimethyl-2-ethyl-5-tertiary-butylbenzene. It was recovered in two cuts, the first cut having an end point of 152.2° C. at 50 mm., a refractive index $n_D^{20}$ 1.5067, a density $d_4^{20}$ of 0.8849 and a second cut having an end point of 152.8° C. at 50 mm., a refractive index $n_D^{20}$ 1.5071 and a density $d_4^{20}$ of 0.8849.

A mixture of 46.7 g. (0.242 mole) of 1,3-dimethyl-2-ethyl-5-tertiary butylbenzene, 94.5 g. (1.21 moles) of benzene and 161 g. (8 moles) of liquid hydrogen fluoride, contained in a copper flask, was stirred vigorously for three hours at 0.° C. The contents of the flask were poured on crushed ice and the hydrofluoric acid neutralized with excess potassium hydroxide. The aqueous phase was extracted with 4–100 ml. portions of ether and the combined organic phase and ether extracts washed with potassium carbonate solution, dried over anhydrous magnesium sulfate and distilled through a 75 cm. x 16 mm. column packed with 3/32 inch pyrex glass helices. The following fractions were obtained:

A. Tertiary-butylbenzene, B. P. 169–170° C., 20.2 g.
B. Intermediate fraction, B. P. 170–189° C., 6.8 g.
C. 1,3-Dimethyl-2-ethylbenzene, B. P. 189–190° C., 19.8 g.
D. Bottoms, 8.9 g.

Spectrometric analysis showed that fraction C contained less than 2% of 1,2,4- and 1,3,5-trisubstituted benzenes. About 80% of this fraction was obtained as four distillation cuts, boiling constant at 190° C. at 760 mm. and with constant refractive indices, $n_D^{20}$ 1.5106. These cuts were shown spectrometrically to be pure 1,3-dimethyl-2-ethylbenzene.

EXAMPLE 2

1,3-dimethyl-2-n-decanoyl-5-t-butylbenzene was prepared by adding 145 g. (1.09 moles) of aluminum chloride, in small portions, over a period of one and one-half hours to a mixture of 200 ml. of carbon disulfide, 162 g. (1.00 mole) of 1,3-dimethyl-5-t-butylbenzene and 190.5 g. (1.00 mole) of decanoyl chloride contained in a flask equipped with stirrer and reflux condenser. The homogeneous mixture was allowed to stand for 24 hours and was then poured on crushed ice to which 100 ml. of 12 N hydrochloric acid had been added. The oil was collected in isopentane, dried over anhydrous magnesium sulfate and fractionated through a fifteen-plate column. The product (261.5 g. 82.5% yield) was obtained as a colorless oil distilling from 181–3° C. at 2 mm.; $n_D^{20}$ 1.4952; $d_4^{20}$ 0.9111.

*Analysis.*—Calculated for $C_{22}H_{36}O$: C, 83.48; H, 11.47. Found: C, 83.27; H, 11.36.

A small forerun and about 10 g. of residue were also obtained in the distillation.

*2,6 - dimethyl-4-t-butylphenyldecene-1.*—Reduction of 1,3-dimethyl-2-n-decanoyl-5-t-butylbenzene to the carbinol.—The ketone (200 g., 0.633 mole) was dissolved in an equal volume of anhydrous ether and added to 15.8 g. (0.416 mole) of lithium aluminum hydride and 1200 ml. of anhydrous ether in a three-necked flask equipped with stirrer, reflux condenser and dropping funnel at a rate sufficient to maintain gentle reflux. The addition required one hour and 20 minutes, stirring was continued for four hours, the mixture allowed to stand overnight and an excess of ethyl acetate added to destroy excess lithium aluminum hydride. The reaction mixture was washed with 350 ml. of 10% sulfuric acid, 300 ml. of water and 250 ml. of 5% sodium carbonate solution and dried over potassium carbonate.

*Dehydration of the carbinol to give 2,6-dimethyl-4-t-butylphenyl-decene-1.*—The crude product was heated on a steam plate to remove ether, 250 ml. of t-butylbenzene was added, and the mixture heated under a 15 cm. Vigreux column at 100 mm. pressure to remove water and any low-boiling materials. The temperature was gradually raised until 10 g. of t-butylbenzene had distilled (B. P. 102° C. at 100 mm.). Anhydrous copper sulfate (1.0 g.) was added as a dehydration catalyst and the mixture refluxed for five hours under a water separator (reactor temperature, 184–6° C.) at which time water formation appeared to be essentially complete. (9.3 ml. of water collected in the separator and a small amount in the condenser. Theory 11.4 g.)

The copper sulfate was filtered off and the t-butylbenzene removed through a 15 cm. Vigreux column at 100 mm. When the temperature in the flask reached 180° C., the pressure was reduced to 10 mm. 2,6-dimethyl-4-t-butylphenyldecene-1 (152.7 g. 80% yield) was collected as a colorless oil from 206–8° C. at 10 mm. Center-cut product had the following properties: B. P. 207.5° C. at 10 mm., $n_D^{20}$ 1.5042; $d_4^{20}$ 0.8731.

*Analysis.*—Calculated for $C_{22}H_{36}$: C, 87.93; H, 12.07. Found: C, 87.95; H, 11.95.

From the shape of the distillation curve it is estimated that an additional 10% yield of product could have been isolated from the transition distillation cuts.

1,3-dimethyl-2-n-decyl-5-t-butylbenzene was prepared by hydrogenation of 123.6 g. (0.411 mole) of 2,6-dimethyl-4-t-butylphenyldecene-1 in suspension in glacial acetic acid using 0.5 g. Adams' platinum catalyst at 25° C. and atmospheric pressure. When hydrogen absorption slowed down, an additional 0.3 g. of catalyst was added, and hydrogenation continued until no more hydrogen was taken up. The mixture was allowed to stand until the catalyst separated, decanted, and diluted with an equal volume of isopentane. The acetic acid was removed by shaking with two volumes of water and 200 ml. of 5% sodium carbonate. The product layer was dried over potassium carbonate and distilled through a fifteen-plate column. 1,3-dimethyl-2-n-decyl-5-t-butylbenzene (105.8 g., 85% yield) was collected from 190–2° C. at 5 mm. ($n_D^{20}$ 1.4929–1.4933). Center-cut product has the following properties: B. P., 191–2° C. at 5 mm., $d_4^{20}$ 0.8675.

*Analysis.*—Calculated for $C_{22}H_{38}$: C, 87.34; H, 12.66. Found: C, 87.37; H, 12.72.

A two-phase mixture of 69.0 g. (0.228 mole) of 1,3-dimethyl-2-n-decyl-5-t-butylbenzene, 212 g. (2.3 moles) of toluene and 210 g. (10.5 moles) of liquid anhydrous hydrogen fluoride was stirred vigorously in a copper flask immersed in an ice bath for six hours. The heavy catalyst layer was discarded; the product layer was treated with ice, shaken with 3 N potassium hydroxide solution, dried over potassium carbonate and fractionally distilled through a fifteen-plate column. 1,3-dimethyl-2-n-decylbenzene (38.10 g.) was collected from 180.0–181.0° C. at 10 mm. ($n_D^{20}$ 1.4919–1.4921) and 12.6 g. of starting material distilling from 207–210° C. at 10 mm. This corresponds to a yield of 68% based on the charge, or 83% based on unrecovered starting material. The product composition estimated from the distillation curve is:

|  | G. |
|---|---|
| Toluene (recovered) | 182.9 |
| t-Butyltoluenes | 25.3 |
| 1,3-dimethyl-2-n-decylbenzene | 42.7 |
| 1,3-dimethyl-2-n-decyl - 5 - t - butylbenzene (recovered) | 15.4 |
| Bottoms | 1.0 |

Using these figures, the yield based on the charge is 76%, or 97% based on unrecovered starting material.

Center-cut product has the following properties: B. P. 181.0° C. at 10 mm.; $n_D^{20}$ 1.4920; $d_4^{20}$ 0.8679.

*Analysis:*—Calculated for $C_{18}H_{30}$: C, 87.73; H, 12.27. Found: C, 87.79; H, 12.02.

Infrared spectrometric analysis of the total product distilling from 180.0–181.0° C. (38.1 g.) showed that it is better than 98% 1,2,3-trialkylbenzene containing less than 1% of 1,2,4- and 1,3,5-trialkylbenzenes.

EXAMPLE 3

*Synthesis of 1,3-dimethyl-2-n-octadecylbenzene.*—1,3-dimethyl-2-n-octadecanoyl-5-t-butylbenzene was prepared by adding 145 g. (1.09 moles) of aluminum chloride, in ten equal portions, over a period of two hours to a mixture of 165 g. (1.02 moles) of 1,3-dimethyl-5-t-butylbenzene, 200 ml. of carbon disulfide and 302.5 g. (1.00 mole) of stearoyl chloride contained in a flask equipped with stirrer and reflux condenser. After standing for 24 hours, the homogeneous, brown liquid was poured over crushed ice, the product collected in two liters of benzene, clarified by centrifuging, and the solvent stripped off. The product was diluted to 1.5 liters with absolute alcohol, warmed to 60° C. and shaken with 100 g. of barium hydroxide octahydrate for one hour, filtered hot and allowed to stand. 1,3-dimethyl-2-n-octadecanoyl-5-t-butylbenzene (284.5 g., 67% yield) was obtained as two crops of light tan crystals, M. P. 40.0–40.8° C. A sample dissolved in absolute alcohol, decolorized with Norite A, filtered through Celite and recrystallized twice from absolute alcohol was obtained as white, compact, rosettes of fine needles, M. P. 41.6–42.0° C.

*Analysis.*—Calculated for $C_{30}H_{52}O$: C, 84.04; H, 12.23. Found: C, 84.18; H, 11.92.

*2,6-dimethyl-4-t-butylphenyloctadecene-1.*—The reduction of 1,3-dimethyl-2-n-octadecanoyl-5-t-butylbenzene to the carbinol was carried out essentially as described for the corresponding n-decyl compound using 256 g. (0.596 mole) of the ketone and 12.3 g. (0.324 mole) of lithium aluminum hydride.

The dehydration was also carried out as described in the n-decyl series. It was, however, somewhat slower, requiring a total of ten hours at 184° C. to complete. By a combination of crystallization from ether and absolute alcohol, and distillation at 1 mm. pressure, a total of 209.8 g. (85% yield) of 2,6-dimethyl-4-t-butylphenyl-octadecene-1 (M. P. 28.0–30.0° C., B. P. approximately 236° C. at 1 mm.) was obtained.

*Analysis.*—Calculated for $C_{30}H_{52}$: C, 87.30; H, 12.70. Found: C, 87.59; H, 12.46.

1,3-dimethyl-2-n-octadecyl-5-t-butylbenzene was prepared by hydrogenating a suspension of 82.1 g. (0.199 mole) of 2,6-dimethyl-4-t-butylphenyl-octadecene-1 in 100 ml. of glacial acetic acid with Adam's platinum catalyst as described for the n-decyl derivative. Crystallization of the product from methanol gave 80.6 g. (98% yield) of 1,3-dimethyl-2-n-octadecyl-5-t-butylbenzene, M. P. 35.5–37.0° C. One recrystallization from methanol and anhydrous ether gave colorless, waxy needles melting from 37.8–38.2° C.

*Analysis.*—Calculated for $C_{30}H_{54}$: C, 86.87, H, 13.13. Found: C, 86.96; H, 13.06.

Another sample distilled from 263.2–263.8° C. at 5 mm. without decomposition. The distillate was water-white and solidified as white crystals.

*1,3-dimethyl-2-n-octadecylbenzene.*—To a complex prepared by dissolving 6.7 g. (0.05 mole) of aluminum chloride in 12.2 g. (0.2 mole) of nitromethane was added 184 g. (2.0 moles) of toluene and 41.5 g. (0.1 mole) of 1,3-dimethyl-2-n-octadecyl-5-t-butylbenzene. The mixture was warmed to 42° C. to dissolve the latter and the mixture stirred. The temperature dropped to 28° C. in 40 minutes, and to 25° C. in two hours where it remained. Stirring was discontinued after a total of two hours and the mixture let stand at room temperature for an additional 20 hours. The mixture was then shaken with 250 ml. of 3 N hydrochloric acid, two 100 ml. portions of 3 N potassium hydroxide with 100 ml. water. After drying over anhydrous magnesium sulfate, the crude reaction product was distilled through a fifteen-plate column. 1,3-dimethyl-2-n-octadecylbenzene was collected from 241–243° C. at 5 mm. After recrystallization from absolute alcohol, it was obtained as 22.2 g. of white crystals melting from 48.5–49.0° C.; yield 60%.

*Analysis.*—Calculated for $C_{26}H_{46}$: C, 87.07; H, 12.93. Found: C, 86.76; H, 12.95.

The total composition of the product estimated from the distillation curve is:

|  | G. |
|---|---|
| t-Butyltoluenes | 12.5 |
| Intermediate fraction | 3.1 |
| 1,3-dimethyl-2-n-octadecylbenzene | 24.5 |
| 1,3-dimethyl-2-n-octadecyl-5-t-butylbenzene (recovered) | 6.7 |
| Total | 46.8 |

This corresponds to a yield of 67% based on the charge or 79% based on unrecovered starting material.

Infrared spectrometric analysis of the recrystallized product shows that it is pure 1,3-dimethyl-2-n-octadecylbenzene.

EXAMPLE 4

*Direct alkylation of 1,3-dimethyl-5-t-butylbenzene with 1-decene.*—Alkylation of one mole of 1,3-dimethyl-5-t-butylbenzene with one mole of 1-decene catalyzed by hydrogen fluoride at 0° C. gave a complex reaction product from which 61.9 g. of crude 1,3-dimethyl-2-decyl-5-t-butylbenzenes distilling from 181.2–193.8° C. at 10 mm. and 50.9 g. of recovered 1,3-dimethyl-5-t-butylbenzene were obtained by fractional distillation.

Alkyl transfer of the t-butyl group from 29.4 g. (0.097 mole) of 1,3-dimethyl-2-decyl-5-t-butylbenzene (B. P. 184.2–193.8° C. at 10 mm. $n_D^{20}$ 1.4900 to 1.4933) to 179 g. (1.94 moles) of toluene was accomplished by stirring these hydrocarbons with 90 g. (4.5 moles) of liquid hydrogen fluoride for four hours and then working up product in the usual manner.

EXAMPLE 5

*Synthesis of hemimellitene from m-xylene.*—1,3-dimethyl-5-t-butylbenzene was obtained by the hydrogen fluoride catalyzed alkylation of m-xylene with isobutene at 0° C. Yield, 82% based on m-xylene charged.

2,6-dimethyl-4-t-butylbenzyl chloride was obtained by chloromethylation of 1,3-dimethyl-5-t-butylbenzene with formalin and concentrated hydrochloric acid by the method of Von Braun and Nelles, Ber. 67, 1094 (1934). Yield, 70.5% based on 1,3-dimethyl-5-t-butylbenzene charged; 90% corrected for recovered starting material.

1,2,3-trimethyl-5-t-butylbenzene was obtained by reduction of the chloromethyl derivative with zinc dust and sodium hydroxide solution as described by Carpenter, U. S. Reissue 22,930 (October 21, 1947), M. S. Carpenter (to Givaudan Delawanna, Inc.). Yield, 72%.

Hemimellitene from 1,2,3-trimethyl-5-t-butylbenzene was obtained by adding a mixture of 176 g. (1.0 mole) of the t-butyl derivative and 424 g. (4.0 moles) of m-xylene to 184 g. (9.2 moles) of liquid hydrogen fluoride contained in a copper flask which was immersed in an ice bath. The mixture was stirred vigorously for 4.5 hours, poured on crushed ice and the acid neutralized with excess potassium hydroxide. The organic phase and ether extracts of the aqueous phase were dried and fractionated through a heated 80 cm. x 25 mm. column packed with 3/32 inch Pyrex helices. The product remaining after removal of the excess m-xylene contained 37.6 weight percent hemimellitene.

EXAMPLE 6

*1,3-dimethyl-2-ethylbenzene by Clemmensen reduction of 2,6-dimethyl-4-t-butylacetophenone.*—The intermediate ketone was obtained in 88% yield by acylation of 1,3-dimethyl-5-t-butylbenzene with acetyl chloride at 0–5° C. catalyzed by aluminum chloride in carbon disulfide. 1,3-dimethyl-2-ethyl-5-t-butylbenzene was obtained in 90% yield (based on unrecovered starting material, 58% conversion) by Clemmensen reduction of the ketone as described by Fuson et al., J. Org. Chem. 12, 587 (1947). The dinitro derivative melted at 130.0–130.5° C.

EXAMPLE 7

*1,3 - dimethyl - 2 - ethylbenzene from 2,6-dimethyl-4-t-butylacetophenone via the carbinol and olefin.*—Methyl-(2,6-dimethyl-4-t-butyl)-phenyl carbinol was obtained using the procedure described by Nystrom and Brown, J. Am. Chem. Soc. 69, 1197 (1947), for the reduction of acetomesitylene. 2,6-dimethyl-4-t-butylacetophenone (81.6 g., 0.40 mole) and 5.9 g. (0.15 mole) of lithium aluminum hydride gave 77.7 g. (95% yield) of product, rectangular prisms from methanol, M. P. 113.0–113.5° C.

2,6-dimethyl-4-t-butylstyrene was obtained by refluxing 71.0 g. (0.34 mole) of methyl-(2,6-dimethyl-4-t-butyl)-phenyl carbinol with 130 ml. of n-decane and 0.10 g. of anhydrous copper sulfate under a water separator. The product distilled constantly at 170.2° C. at 100 mm. pressure. Center cut product had the following properties: B. P. 170.2° C. at 100 mm.; M. P., 1.33° C.; $n_D^{20}$ 1.5220; $d_4^{20}$ 0.8939.

*Analysis.*—Calculated for $C_{14}H_{20}$: C, 89.29; H, 10.71. Found: C, 89.11; H, 10.91.

1,3 - dimethyl - 2-ethyl-5-t-butylbenzene was obtained quantitatively by hydrogenating 15.4 g. of 2,6-dimethyl-4-t-butylstyrene dissolved in 25 ml. of absolute alcohol over 60 mg. of Adams' platinum oxide catalyst at room temperature and pressure.

I claim:

1. A process for producing 1,2,3-trialkyl benzenes which comprises contacting a trialkyl benzene of the group consisting of 1,2-dialkyl-4-tertiary-butyl benzenes and 1,3-dialkyl-5-tertiary-butyl benzenes in which the alkyl groups in the 1, 2 and 3 positions contain from 1 to 3 carbon atoms with nontertiary alkylating agent containing 6 to 20 carbon atoms in the presence of an alkylation catalyst under alkylating conditions to selectively replace the nuclear hydrogen atom furthest removed from the tertiary-butyl group with the alkylating agent, contacting the resultant 1,2,3-trialkyl-5-tertiary-butyl benzene with a benzene hydrocarbon of the group consisting of benzene, toluene, ortho-xylene and meta-xylene in the presence of a liquid alkylation catalyst under alkylating conditions and temperatures in the range of −10 to +100° C. to remove the tertiary-butyl group from the 1,2,3-trialkyl-5-tertiary-butyl benzene and recovering a 1,2,3-trialkyl benzene from the reaction product.

2. A process for producing 1,2,3-trialkyl benzenes which comprises contacting a trialkyl benzene of the group consisting of 1,2-dialkyl-4-tertiary-butyl benzenes and 1,3-dialkyl-5-tertiary-butyl benzenes in which the alkyl groups in the 1, 2 and 3 positions contain from 1 to 3 carbon atoms with a nontertiary alkylating agent containing 10 carbon atoms in the presence of an alkylation catalyst under alkylating conditions to selectively replace the nuclear hydrogen atom furthest removed from the tertiary-butyl group with the alkylating agent, contacting the resulting 1,2,3-trialkyl-5-tertiary-butyl benzene with a benzene hydrocarbon of the group consisting of benzene, toluene, ortho-xylene and meta-xylene in the presence of a liquid alkylation catalyst under alkylating conditions and temperatures in the range of −10 to +100° C. to remove the tertiary-butyl group from the 1,2,3-trialkyl-5-tertiary-butyl benzene and recovering a 1,2,3-trialkyl benzene from the reaction product.

3. A process for producing 1,2,3-trialkyl benzenes which comprises contacting a trialkyl benzene of the group consisting of 1,2-dialkyl-4-tertiary-butyl benzenes and 1,3-dialkyl-5-tertiary-butyl benzenes in which the alkyl groups in the 1, 2 and 3 positions contain from 1 to 3 carbon atoms with a nontertiary alkylating agent containing 18 carbon atoms in the presence of an alkylation catalyst under alkylating conditions to selectively replace the nuclear hydrogen atom furthest removed from the tertiary-butyl group with the alkylating agent, contacting the resultant 1,2,3-trialkyl-5-tertiary-butyl benzene with a benzene hydrocarbon of the group consisting of benzene, toluene, ortho-xylene and meta-xylene in the presence of a liquid alkylation catalyst under alkylating conditions and temperatures in the range of −10 to +100° C. to remove the tertiary-butyl group from the 1,2,3-trialkyl-5-tertiary-butyl benzene and recovering a 1,2,3-trialkyl benzene from the reaction product.

References Cited in the file of this patent

UNITED STATES PATENTS

| | | |
|---|---|---|
| Re.22,930 | Carpenter | Oct. 21, 1947 |
| 2,023,566 | Wirth | Dec. 10, 1935 |
| 2,385,524 | Mattox | Sept. 25, 1945 |
| 2,589,057 | Corson | Mar. 11, 1952 |
| 2,648,713 | Schneider | Aug. 11, 1953 |

OTHER REFERENCES

Beilstein: "Handbuch der Org. Chemie," 4th edition (1943), vol. 5, Second Supplement, page 346, item 5.